US012656962B2

(12) United States Patent
Ikeda

(10) Patent No.: US 12,656,962 B2
(45) Date of Patent: Jun. 16, 2026

(54) AUTHENTICATION SERVER, AUTHENTICATION SYSTEM, AND AUTHENTICATION METHOD

(71) Applicant: Hitachi Industry & Control Solutions, Ltd., Tokyo (JP)

(72) Inventor: Makoto Ikeda, Tokyo (JP)

(73) Assignee: Hitachi Indusrty & Control Solutions, Ltd., Tokyo (JP)

( * ) Notice: Subject to any disclaimer, the term of this patent is extended or adjusted under 35 U.S.C. 154(b) by 0 days.

(21) Appl. No.: 18/974,050

(22) Filed: Dec. 9, 2024

(65) Prior Publication Data

US 2025/0238148 A1 Jul. 24, 2025

(30) Foreign Application Priority Data

Jan. 18, 2024 (JP) ................................. 2024-005902

(51) Int. Cl.
G06F 3/06 (2006.01)
(52) U.S. Cl.
CPC .......... G06F 3/0622 (2013.01); G06F 3/0655 (2013.01); G06F 3/0673 (2013.01)
(58) Field of Classification Search
CPC ..... G06F 3/0622; G06F 3/0655; G06F 3/0673
See application file for complete search history.

(56) References Cited

U.S. PATENT DOCUMENTS

2002/0026582 A1* 2/2002 Futamura .............. H04L 9/3268
713/170

FOREIGN PATENT DOCUMENTS

JP 2021-096512 A 6/2021
JP 7499426 B1 6/2024

* cited by examiner

*Primary Examiner* — Jae U Yu
(74) *Attorney, Agent, or Firm* — Volpe Koenig

(57) ABSTRACT

An authentication server capable of accessing data in a memory of a control device is configured to: detect authentication input information being written into the memory by monitoring access to the memory and read, from the memory, the authentication input information written into the memory; check the authentication input information against account information registered in a user database to generate an authentication result for the authentication input information; and write the authentication result for the authentication input information into the memory of the control device, thereby to notify the control device of availability of control processing based on the authentication result.

10 Claims, 4 Drawing Sheets

| ID | PW | PLC-ID | State | Operation Privilege | Display Name |
|----|----|--------|-------|---------------------|--------------|
| U1 | PW1 | P1 | Auth granted | Administrator | UserLV2 |
| U1 | PW1 | P2 | Auth in progress | | |
| U2 | PW2 | P1 | Auth denied | | |

51

| ID | PW | PLC-ID | Operation Privilege | Display Name |
|----|----|--------|---------------------|--------------|
| U1 | PW1 | P1 | Administrator | UserLV2 |
| U1 | PW1 | P2 | Staff | UserLV1 |

21T

| PLC Function | Operation Privilege | |
|--------------|---------------------|--|
| | Administrator | Staff |
| Sensor value acquisition | Permitted | Permitted |
| Conveyor belt control | Permitted | Permitted |
| Robot arm control | Permitted | Not permitted |
| Tank temperature control | Permitted | Not permitted |

FIG. 7

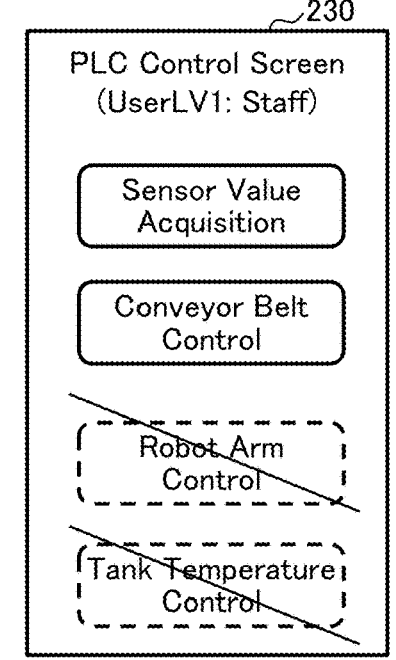

220

PLC Control Screen
(UserLV2: Administrator)

Sensor Value Acquisition

Conveyor Belt Control

Robot Arm Control

Tank Temperature Control

230

PLC Control Screen
(UserLV1: Staff)

Sensor Value Acquisition

Conveyor Belt Control

Robot Arm Control

Tank Temperature Control

AUTHENTICATION SERVER, AUTHENTICATION SYSTEM, AND AUTHENTICATION METHOD

CROSS REFERENCE TO RELATED APPLICATIONS

This application claims foreign priority to Japanese Patent Application No. 2024-005902, filed Jan. 18, 2024, the disclosure of which is incorporated herein by reference.

BACKGROUND OF THE INVENTION

Technical Field

The present invention relates to an authentication server, and authentication system, and an authentication method.

Description of Related Art

In pharmaceutical manufacturing, record keeping of manufacturing is required according to GMP (Good Manufacturing Practice) standards and other regulations. Record keeping is increasingly shifting from traditional paper to electrical data. As electrical data is easy to be copied or tampered with, it is required the original data be preserved and information on operation handling be recorded to guarantee the authenticity of the stored data.

International guidelines for the handling of electrical data of pharmaceutical manufacturing records have been established, such as CFR 21 PART 11 by the U.S. Food and Drug Administration (FDA) and Annex 11 by the Pharmaceutical Inspection Convention and Pharmaceutical Inspection Co-operation Scheme (PIC/S).

Pharmaceutical manufacturers in each country are obligated to manage electrical data of pharmaceutical manufacturing records to meet these requirements. These guidelines state that the "when," "who," "what," "how," and "why" of the electrical data handling of pharmaceutical manufacturing records should be recorded.

Thus, in order to keep track of who the user operates the equipment is, a mechanism to authenticate the user who logs into the equipment in advance has become widespread.

For example, Japanese Patent Application Publication No. 2021-096512 describes a mechanism in which an authentication server that receives an ID and a password entered into an authentication switch queries an external directory server, an LDAP (Lightweight Directory Access Protocol) server, for success or failure of authentication. Thus, by using network authentication, there is no need for the device to which login is to be performed to have a function of determining success or failure of authentication.

SUMMARY OF THE INVENTION

Problems to be Solved

The authentication switch described in Japanese Patent Application Publication No. 2021-096512 has a function of issuing an authentication request to an authentication server based on an ID and a password entered by a user. A device like this authentication switch, which has enough performance to perform authentication protocol processing on its own, network authentication will be smooth.

On the other hand, in a manufacturing site for manufacturing pharmaceuticals and the like, Programmable Logic Controllers (PLCs), which are control devices operated by users to control manufacturing equipment, and terminals for inputting operation commands to the PLCs are deployed. It is often that those manufacturing site devices are of proprietary specifications of the manufacturers providing the PLCs and do not implement standard authentication protocols. Thus, without modification, it is difficult to retrieve data that requires authentication, such as information on who is the person who inputs operation commands to the terminal and further whether to accept the input operation commands.

An alternative is to implement in the PLCs a function of local authentication that determines success or failure of authentication with the input ID and password without performing network authentication. Although implementing local authentication indeed does not require implementation of authentication protocols, it results in an increase in the management cost in preparation of configuration data for local authentication separately for each number of PLCs, in addition to the cost of the sophisticated PLCs.

The present invention is made in view of the above circumstances and it is an object of the invention to provide network authentication functionality even to a device that does not implement authentication protocols.

Solution

To resolve the above-described problems, an aspect of a certain embodiment of the present invention is an authentication server capable of accessing data in a memory of a control device, wherein the authentication server is configured to:

detect authentication input information being written into the memory by monitoring access to the memory and read, from the memory, the authentication input information written into the memory;

check the authentication input information against account information registered in a user database to generate an authentication result for the authentication input information; and write the authentication result for the authentication input information into the memory of the control device, thereby to notify the control device of availability of control processing based on the authentication result.

Other aspects of the embodiment will be described later.

Advantageous Effects of Invention

According to the present invention, it is possible even for a device not implementing authentication protocol to provide network authentication.

BRIEF DESCRIPTION OF THE DRAWINGS

FIG. 6 is an explanatory diagram showing details of databases used in the authentication system according to the embodiment.

FIG. 7 shows samples of control screen of a PLC according to the embodiment.

DETAILED DESCRIPTION

Hereinbelow, a description will be given of an embodiment of the present invention with reference to the drawings.

Figures 1, 2:
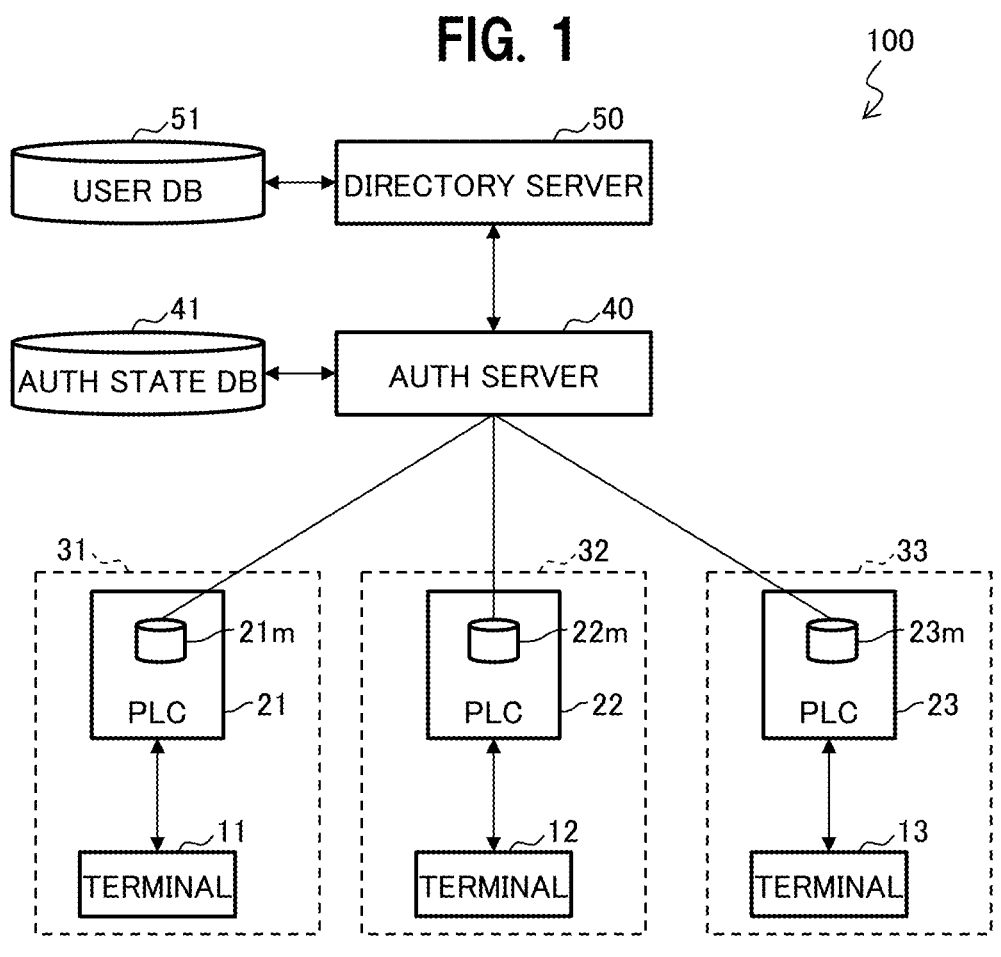
FIG. 1 is a configuration diagram of an authentication system according to an embodiment.
FIG. 2 is a hardware configuration diagram of each device of the authentication system according to the embodiment.

FIG. 1 is a configuration diagram of an authentication system 100.

The authentication system 100 includes a PLC 21, a terminal 11, an authentication server 40, and a directory server 50, which are connected by a network. First, a description will be given of a function of controlling an apparatus, provided by the authentication system 100.

The PLCs 21 to 23 are control devices connected to manufacturing apparatuses and configured to issue control commands to the manufacturing apparatuses. These PLCs 21 to 23 may or may not support authentication protocols such as LDAP.

The terminals 11 to 13 are respectively provided associated with the PLCs 21 to 23 to operate them, respectively.

The PLC 21 and the terminal 11 are directly connected with each other and may be arranged on the same workbench 31. Similarly, the PLC 22 and the terminal 12 are directly connected with each other and may be arranged on the same workbench 32; and the PLC 23 and the terminal 13 are directly connected with each other and may be arranged on the same workbench 33. In addition, the terminal 11 is capable of operating only the PLC 21 and is not capable of accessing the other PLCs 22 and 23. The direct connection between the PLC 21 and the terminal 11 may be established in the following configurations:

The PLC 21 and the terminal 11 are configured as single device housed in the same housing. In this case, for example, the functions of the terminal 11 may be implemented in a touch panel provided associated with the PLC 21.

The PLC 21 and the terminal 11 are connected with a wired communication line such as a USB cable and the PLC 21 is not connected to the other terminals 12 and 13 with wired communication lines. As such, the PLCs may each be configured with only a single USB port.

The PLC 21 and the terminal 11 are connected with a proprietary wireless protocol of the PLC 21, to enable data communication therebetween. In this case, for example, proprietary wireless protocol of the PLC 21 may not be implemented in the terminals 12 and 13.

The workbenches 31 to 33 are physically spaced apart from one another by 10 meters for example, so that the terminal 11 is not able to operate the PLCs 22 and 23, which are physically distant from the terminal 11.

Next, a description will be given of the authentication function provided by the authentication system 100. Here, the "authentication" of the authentication function is the processing of determining which users are granted permission to use which PLCs 21 to 23. For example, to perform the following three operations, a total of three authentications are required.

A user U1 performs a first operation via the PLC 21. For that, the user U1 writes, via the terminal 11, his/her own identifier (ID) and password (PW) into a memory 21*m* of the PLC 21, to issue an authentication request.

The user U1 performs a second operation via the PLC 22. For that, the user U1 writes, via the terminal 12, his/her own ID and PW into a memory 22*m* of the PLC 22, to issue an authentication request.

A user U2 performs a third operation via the PLC 22. For that, the user U2 rites, via the terminal 12, his/her own ID and PW into the memory 22*m* of the PLC 22, to issue an authentication request.

The authentication server 40 monitors accesses to the memory 21*m* (see FIG. 5 for details) in the PLC 21, and upon detection of a combination of a user ID and password (ID, PW) written into the memory 21*m*, creates an authentication request based on the combination (ID, PW) and transmits the created authentication request to the directory server 50.

The directory server 50 is configured as an external certificate authority, such as an LDAP server, which works for the authentication server 40. The function of the authentication server 40 and the function of the directory server 50 may be integrated into a single device housed in the same housing.

The authentication server 40, capable of accessing data in the memory 21*m* of the PLC 21, has the following functions:

A function of detecting and reading authentication input information written into the memory 21*m* by monitoring.

A function of checking the authentication input information against account information stored in the user database (DB) 51, to generate an authentication result for the authentication input information.

A function of writing the authentication result for the authentication input information into the memory 21*m* in the PLC 21 to notify the PLC 21 of the authentication-based allowability of control processing.

The directory server 50 checks the received authentication request with the user DB 51 (see FIG. 5 for details) in which combinations of user ID and password are managed, to grant authentication requests including any of combinations registered in the user DB 51 and to deny authentication requests not including any combination of ID and PW registered in the user DB 51.

The directory server 50 replies to the authentication server 40 to write information indicative of the authentication result (authentication granted or authentication denied) (hereinafter denoted Result) into the memory 21*m* in the authentication request source PLC 21. With this, the PLC 21 references the Result in its memory 21*m* to determine grant/denial of a control command issued afterward from the terminal 11.

FIG. 2 is a hardware configuration diagram of each device (terminals 11 to 13, PLCs 21 to 23, authentication server 40, and directory server 50) of the authentication system 100.

Each device of the authentication system 100 is configured as a computer 900 that includes a CPU 901, a RAM 902, a ROM 903, an HDD 904, a communication I/F 905, an input/output I/F 906, and a media I/F 907.

The communication I/F 905 is connected with an external communication device 915. The input/output I/F 906 is connected with an input/output device 916. The media I/F 907 reads/writes data from/to a recording medium 917. The CPU 901 executes a computer program (so called "application" or "appli" as the abbreviation thereof) read onto the RAM 902, to control various processing components. The computer program may be delivered via a communication line or may be recorded in the recording medium 917 such as a CD-ROM to be delivered.

Figure 3:
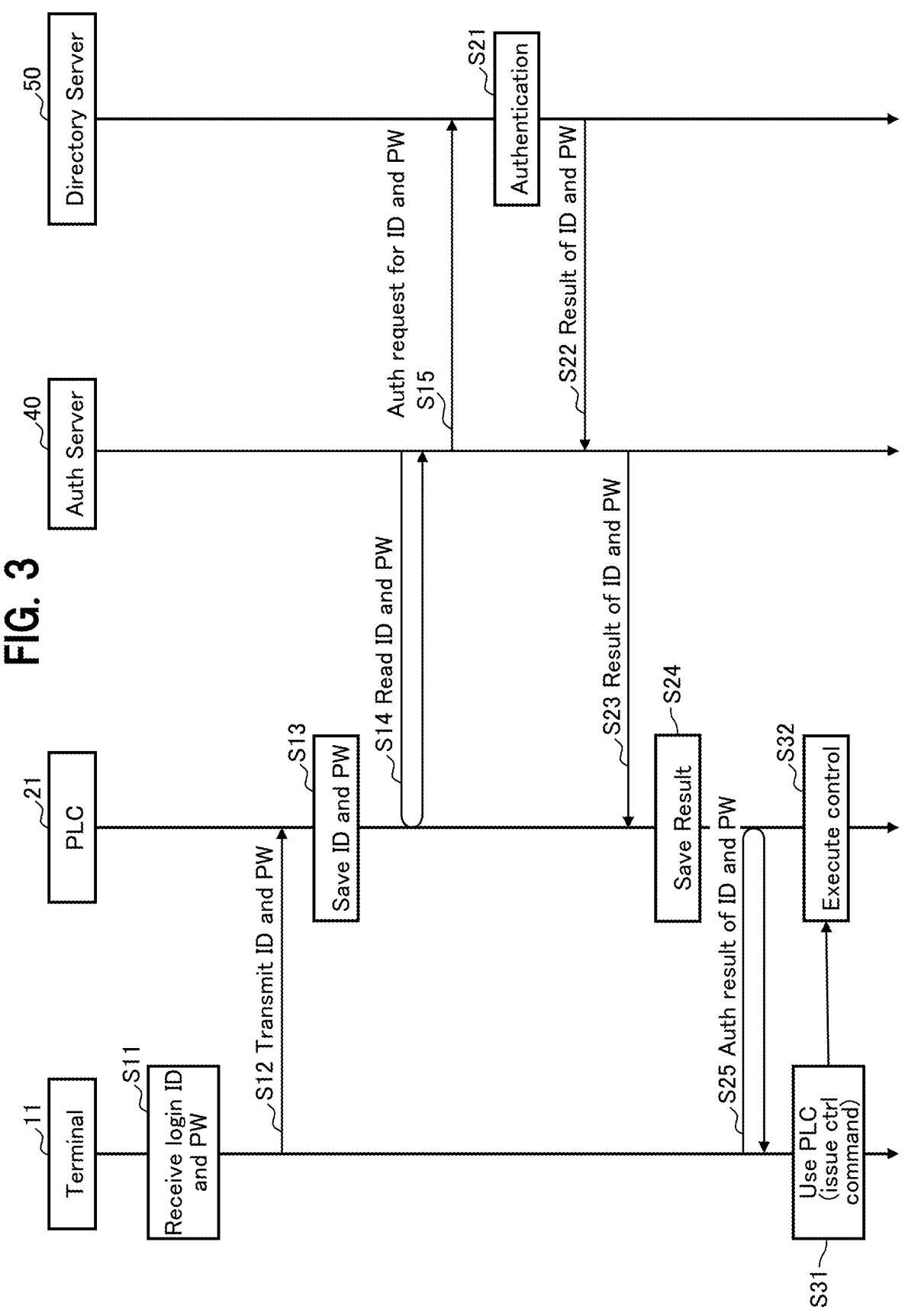
FIG. 3 is a sequence diagram representing processing of the authentication system according to the embodiment.

FIG. 3 is a sequence diagram representing the processing of the authentication system 100.

In step S11, the terminal 11 receives a combination of user ID and password (ID, PW) from the user as authentication input information. Note that as the authentication input information, any identification information, examples of which include biometric authentication input information such as fingerprints or tag information read from the employee ID card provided by the user, may be used instead of using the combination of user ID and password (ID, PW).

Figure 4:
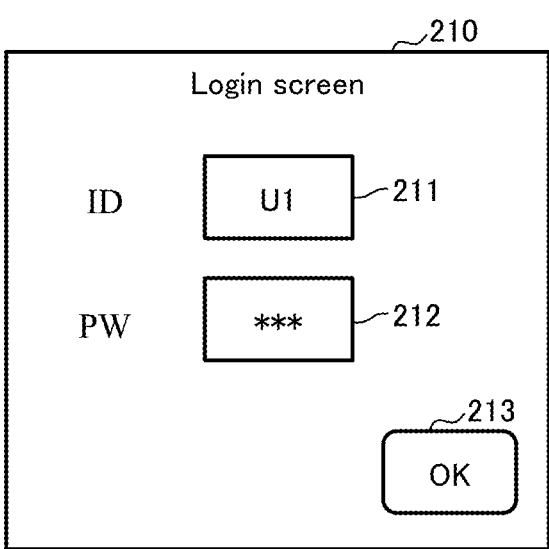
FIG. 4 shows a sample of login screen according to the embodiment.

FIG. 4 is an example of the login screen to be displayed in step S11.

The user enters his/her user ID and password into the ID field 211 and PW field 212 respectively in the login screen 210 displayed on the terminal 11 and then selects the OK button 213.

Returning to FIG. 3, in step S12, the terminal 11 transmits the authentication input information (ID, PW) input in step S11 to PLC 21.

In step S13, PLC 21 stores the authentication input information (ID, PW) transmitted in step S12 into its own memory 21*m*.

Figure 5:
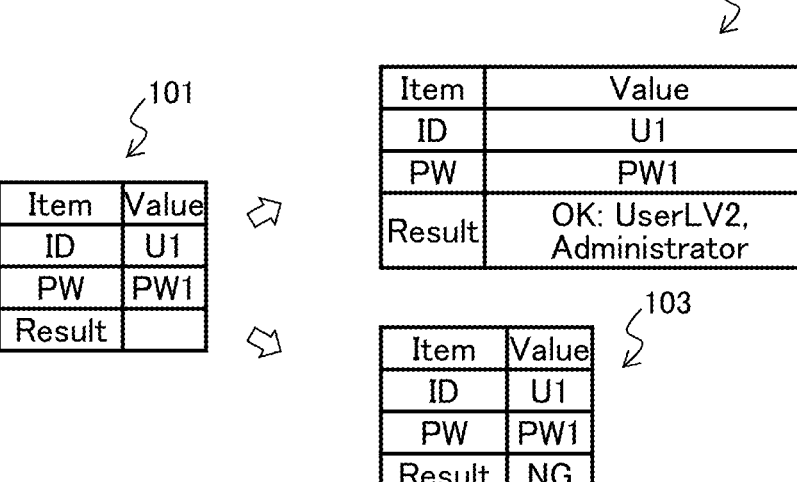
FIG. 5 is an explanatory diagram showing details of the data content stored in memory according to the embodiment.

FIG. 5 is an explanatory diagram illustrating data content of the memory 21*m*.

The memory area 101 in the memory 21*m* is filled with the authentication input information (ID, PW) stored in step S13 and the authentication result (Result) of the authentication of the user who has input the authentication input information (ID, PW).

Note that the terminal 11 and the authentication server 40 are to agree in advance upon information on the address of a memory area 101 in the memory 21*m* where the items ID, PW, and Result are to be stored. With this, the terminal 11 and the authentication server 40 are to read/write the items ID, PW, and Result with direct addressing in the memory area 101 of the memory 21*m*. That is, the terminal 11 and the authentication server 40 uses raw level accesses. The authentication server 40 then accesses data in the memory 21*m* through a PLC manufacturer's proprietary protocol or an interoperable international standard protocol such as OLE for Process Control (OPC).

The memory area 101 illustrated in FIG. 5 represents the content stored at the time of step S13. At this time, the ID and PW input in step S11 are filled in but the item Result is left blank, which means that authentication is in progress.

The memory area 102 illustrated in FIG. 5 represents a first example of the content stored at the time of the below-described step S24. In this first example, a Result indicating that the authentication with the input ID and PW has been granted has been added.

The memory area 103 illustrated in FIG. 5 represents a second example of the content stored at the time of the below-described step S24. In this second example, a Result indicating that the authentication with the input ID and PW has been denied has been added.

Note that the PLC 21 and the authentication server 40 may encrypt the information to be written into the memory areas 101 to 103 of the memory 21*m* using an encryption scheme negotiated in advance between the PLC 21 and the authentication server 40.

The PLC 21 encrypts the information to be written into the memory 21*m* and the writes the encrypted information into the memory 21*m*.

The authentication server 40 decrypts the information read from the memory 21*m*.

This prevents direct data attacks into the memory 21*m* (e.g., unauthorized data writing and stealing) by a third party.

Returning to FIG. 3, in step S14, the authentication server 40 directly monitors accesses into the memory 21*m* of the PLC 21. When ID and PW are newly written, the authentication server 40 reads the ID and PW written.

In step S15, the authentication server 40 creates an authentication request including the read ID and PW and transmits the created authentication request to the directory server 50. The authentication request may include an ID (PLC-ID) of the PLC 21.

In step S21, the directory server 50 performs authentication processing on the authentication request issued in step S15. Specifically, the directory server 50 checks the authentication request received in step S14 with the accounts registered in the user DB 51, thereby to grant authentication requests including any of the accounts registered in the user DB 51 and to deny authentication requests for accounts not registered in the user DB 51.

In step S22, the directory server 50 transmits to the authentication server 40 a response message in which the authentication result (Result) of step S21 is associated with the authentication request (ID, PW).

Note that when the authentication server 40 and the directory server 50 are arranged in the same housing, in step S22, when the ID of the PLC 21 in which the authentication input information has been detected has been registered in the user DB 51 in addition to the authentication input information, the authentication server 40 generates an authentication result (Result) indicating grant of the authentication. To make this possible, the account information registered in the user DB 51 includes the ID of the PLC 21 associated with the authentication input information. This makes it possible to grant a different privilege to a single user for each of a plurality of PLCs (pieces of equipment).

FIG. 6 is an explanatory diagram illustrating details of databases used for the authentication system 100.

The authentication server 40 manages, in the authentication state database (DB) 41, currently continuing authentication states. The authentication state DB 41 stores, for each authentication request, information on authentication request (ID, PW, PLC-ID), the current authentication state, and information on the Result (operation privilege, display name), associated with one another.

The current authentication state indicates a state of "authentication in progress" which is written at the time of step S15 before issuing the Result; or a state of "authentication granted" or "authentication denied" which is written at the time of step S22, indicating the Result representing success/failure of the authentication.

The operation privilege indicates the allowable operations on the PLC 21 when the authentication is granted, as a position name (administrator or staff) classified for "operation privilege" of the privilege table 21T. Note that the privilege table 21T associates each function of the PLC with operation privileges allowed to use the function.

The display name is a character string to be displayed on the screen when a user whose authentication is granted performs an operation via the terminal 11.

Note that, in this example, the authentication state DB 41 stores records each representing only the current authentication state. The authentication server 40 may store past records of the authentication state DB 41 in time series. This is useful to, upon the occurrence of a problem, trace the cause of the problem, such as who was using which PLC when.

The authentication server 40 may monitor the time elapsed during the authentication processing (elapsed time from step S13 to step S24) and when the elapsed time exceeds a predetermined time, determine that a timeout has occurred and notify the terminal 11 of a failure (not denial)

of the authentication. Specifically, the authentication server 40, when no response to the authentication request transmitted to the directory server 50 is received for a predetermined time, writes into the memory 21*m* an authentication result indicating a failure of the authentication processing. The cause of this timeout could be a device failure of the authentication server 40, a device failure of the directory server 50, or a network failure between the authentication server 40 and the directory server 50.

When such a failure of the authentication processing of network authentication occurs, the terminal 11 may perform a login process and granting an operation privilege through local authentication based on an emergency administrator's account prepared inside the PLC 21. Local authentication is an authentication that is completed inside the PLC 21 without involving the authentication server 40 and directory server 50.

In the user DB 51, an administrator or the like prepares, as account information: information (ID, PW, PLC-ID) for checking with authentication requests; and information (operation privilege, display name) to be included in the Result when the check succeeds. Note that including information on PLC-IDs in the user DB 51 makes it possible to grant operation privileges to a person according to his/her specialties such that, even for the same user U1, an administrator privilege is granted for operating the PLC 21, which handles a manufacturing apparatus in his/her specialty (e.g., "culture equipment," "purification equipment," and "reaction tanks" used in the pharmaceutical process), while a staff privilege is granted for operating the PLC 22, which handles a logistics apparatus not in hir/her specialty.

Note that in each of the pieces of equipment to be respectively controlled via the PLC 21 to 23, changing its settings may have significant impact on the manufacturing qualities. By managing operation privileges in the user DB 51 so that only users with a high level of expertise are allowed to perform operations that have an impact on the qualities, it is possible to collectively manage the manufacturing qualities and user accounts by means of the user DB 51.

Some items may be omitted in the user DB 51 as follows:

The display name may be omitted, in which case no display name will be displayed on the screen of the terminal 11 but there is no influence on the authentication processing.

The operation privileges may be omitted, in which case the allowable functions to be performed based on the authentication will be all the functions handled by the PLC 21 rather than certain ones of all the functions handled by the PLC 21.

The PLC-ID may be omitted, in which case the allowable PLC based on the authentication will be any one of the PLCs 21 to 23 for which authentication is requested rather than a specific one of the PLCs 21 to 23 for which authentication is requested.

Returning to FIG. 3, in step S23, the authentication server 40 notifies the PLC 21 of the authentication result (Result) received in step S22 for the authentication request (ID, PW), by writing the Result into the memory 21*m* in the PLC 21, which is the authentication request source. That is, when writing the authentication result into the memory 21*m* in the PLC 21, by also writing the information indicating the operation privilege, the authentication server 40 notifies the PLC 21 of the availability of the control processing within the operation privilege based on the authentication result. To make this possible, the account information registered in the user DB 51 includes, in addition to authentication input information, information indicating operation privileges associated with functions provided by the PLC 21.

In step S24, the PLC 21 stores the authentication result (Result) of step S23 in the memory 21*m* like as illustrated as memory area 102 or memory area 103 illustrated in FIG. 5. That is, when the authentication is granted, in addition to the authentication result "OK", the operation privilege and display name will also be written as illustrated in 102; and when the authentication is denied, the authentication result (Result) will be written as "NG" (denied) as illustrated in 103.

In step S25, the terminal 11 reads the authentication result (Result) for the login information (ID and PW) transmitted in step S12, from the memory 21*m* in the PLC 21.

In step S31, the terminal 11 presents a PLC control screen to which the authentication result (Result) read in step S25 is reflected and receive control commands from the user. Note that, when the Result indicates denial of the authentication, the terminal 11 presents a screen indicating a failure of the login and then presents an initial login screen for accepting another user. When the Result indicates grant of the authentication, in step S32, the PLC 21 executes the control command received from the user through the terminal 11 in step S31 by communicating the control commands to equipment or the like not illustrated.

Alternatively, instead of the terminal 11 reading the authentication result (Result) in step S25, the PLC 21 may read it in step S25. In this case, in step S32, the PLC 21 compares the control commands received from the user through the terminal 11 and the authentication result (Result) read in step S25 and executes control commands only for the functions allowed according to the "operation privilege" described in the privilege table 21T.

Moreover, the terminal 11 may set a time limit (e.g., 15 minutes) for receiving operations in step S31 and when no operation is performed within the time limit, delete the authentication result (Result) stored in step S24 and perform a forcible logout. In this case, when the authentication server 40 writes the authentication result into the memory 21*m* in the PLC 21 and then receives a notification from the PLC 21 that a forcible logout occurs due to no operation on the PLC 21 being performed for a predetermined time, the authentication server 40 deletes the authentication result from the memory 21*m* in the PLC 21. This appropriately prohibits a user U2 from operating the PLC 21 while a user U1 having succeeded in authentication for the PLC 21 is away from the PLC 21.

FIG. 7 illustrates examples of a control screen for a PLC.

The control screen 220 is a screen to be displayed when the operation privilege is "administrator". In this case, the display name is presented as "UserLV2". As is illustrated as the operation privileges for an administrator in the privilege table 21T illustrated in FIG. 6, all the operation buttons (sensor value acquisition, conveyor belt control, robot arm control, and tank temperature control) provided by the PLC 21 are enabled to be selected.

The control screen 230 is a screen to be displayed when the operation privilege is "staff". In this case, the display name is presented as "UserLV1". As is illustrated as the operation privileges for a staff in the privilege table 21T, some (robot arm control and tank temperature control) of the operation buttons provided by the PLC 21 are disabled because operation privileges for them are not granted.

The above-described authentication system 100 according to the embodiment includes the PLC 21, the authentication server 40, and the directory server 50 and has the following features:

The PLC 21 writes input authentication input information into its own memory 21*m*.

The authentication server 40 detects and reads the authentication input information written into the memory 21*m* and transmits an authentication request including that authentication input information to the directory server 50.

The directory server 50 checks the authentication input information included in the authentication request against the account information registered in the user DB 51 to generate an authentication result for the authentication input information and replies to the authentication server 40 with the authentication result.

The authentication server 40 writes the authentication result for the authentication input information into the memory 21*m*.

The PLC 21 determines the availability of the control processing based on the authentication result read from the memory 21*m*.

This authentication system 100 enjoys the following advantageous effects:

The authentication server 40 requests an external authentication to the user DB 51 of the directory server 50 on behalf of the PLC 21, thereby extending integrated administration of users to the PLCs 21 to 23 not having an authentication protocol function such as LDAP.

As the PLC 21 does not need to have local authentication functionality inside the PLC 21, it is possible to concentrate the administration of accounts on the single entity of the directory server 50. As a result, even when the number of PLCs 21 to 23 increases, it is possible to reduce the maintenance workload for account administration.

As the PLC 21 does not need to have an authentication protocol function inside the PLC 21, it is possible to add a network authentication function to the authentication system 100 while using the old PLC 21 to 23 already in operation as they are.

Furthermore, the invention is not limited to the embodiment described above, and it is obvious that various other applications and modifications can be made without departing from the gist of the invention as set forth in the claims. For example, the embodiment described above explains the configuration of authentication system 100 in detail and specifically in order to explain the invention in an easy-to-understand manner, and is not necessarily limited to including all the explained constituent elements. In addition, a part of the configuration of a certain embodiment can be replaced with a constituent element of another embodiment. In addition, a constituent element of another embodiment can also be added to a configuration of a certain embodiment. In addition, replacement, or deletion of another constituent element can also be made to a part of a configuration of the embodiment.

Some or all of the configurations, the functions, the processing components, and the like described above may be implemented by hardware by, for example, performing design with an integrated circuit. As the hardware, a processor device in a broad sense such as a field programmable gate array (FPGA) or an application specific integrated circuit (ASIC) may be used.

In addition, each constituent element of the authentication system 100 according to the embodiment described above may be implemented on any hardware as long as the hardware can transmit and receive information to and from each other via a network. In addition, processing executed by a certain processing component may be implemented by one piece of hardware, or may be implemented by a distributed process by a plurality of pieces of hardware.

The invention claimed is:

1. An authentication server capable of accessing data in a memory of a programmable logic controller (PLC) that does not implement standard authentication protocols and that is connected to manufacturing equipment, the authentication server configured to:

detect authentication input information being written into the memory of the PLC by monitoring access to the memory of the PLC and read, from the memory of the PLC, the authentication input information written into the memory of the PLC;

check the authentication input information against account information registered in a user database to generate an authentication result for the authentication input information; and write the authentication result for the authentication input information into the memory of the PLC, thereby to notify the PLC of availability of control processing for the manufacturing equipment based on the authentication result.

2. The authentication server according to claim 1, wherein the account information registered in the user database is associated with, in addition to the authentication input information, an identifier of the PLC, and wherein the authentication server is further configured to, when the identifier of the PLC, in which the authentication server has detected the authentication input information, has been registered in the user database in addition to the authentication input information, generate the authentication result so as to indicate granting of authentication.

3. The authentication server according to claim 1, wherein the account information registered in the user database is associated with, in addition to the authentication input information, information on operation privileges for performing functions provided by the PLC, and wherein the authentication server is further configured to, when writing the authentication result into the memory of the PLC, write information on the operation privileges into the memory as well, thereby to notify the PLC of the availability of control processing according to the operation privileges based on the authentication result.

4. The authentication server according to claim 1, wherein the authentication server is further configured to, when the authentication server writes the authentication result into the memory of the PLC and then receives a notification from the PLC that a forcible logout occurs due to no operation on the PLC having been performed for a predetermined time, delete the authentication result from the memory of the PLC.

5. An authentication system comprising a programmable logic controller (PLC) that does not implement standard authentication protocols and that is connected to manufacturing equipment, an authentication server, and a directory server, wherein the PLC is configured to write input authentication input information into a memory of the PLC, wherein the authentication server is configured to detect the authentication input information being written into the memory by monitoring access to the memory, read, from the memory, the authentication input information written into the memory, and transmit an authentication request including the authentication input information to the directory server, wherein the directory server is configured to check the authentication input information included in the authentication request against account information registered in a user database to generate an authentication result for the authentication input information and return the generated authentication result to the authentication server, wherein the authentication server is further configured to write the authentication result for the authentication input information into the memory, and wherein the PLC is further configured to read the authentication result written into the memory and determine availability of control processing for the manufacturing equipment based on the authentication result read from the memory.

6. The authentication system according to claim 5, wherein the authentication server is further configured to, when no response to the authentication request transmitted to the directory server is received for a predetermined time, write the authentication result into the memory so as to indicate a failure of authentication processing.

7. The authentication system according to claim 5, wherein the PLC is further configured to encrypt information to be written into the memory and write the encrypted information into the memory, and wherein the authentication server is further configured to decrypt information read from the memory.

8. The authentication server according to claim 1, wherein the authentication input information comprises a user ID and a password.

9. The authentication system according to claim 5, wherein the authentication input information comprises a user ID and a password.

10. An authentication method for an authentication server, the authentication server being capable of accessing data in a memory of a programmable logic controller (PLC) that does not implement standard authentication protocols and that is connected to manufacturing equipment, the authentication method comprising steps of, by the authentication server:

detecting authentication input information being written into the memory of the PLC by monitoring access to the memory of the PLC and reading, from the memory of the PLC, the authentication input information written into the memory of the PLC;

checking the authentication input information against account information registered in a user database to generate an authentication result for the authentication input information; and writing the authentication result for the authentication input information into the memory of the PLC, thereby to notify the PLC of availability of control processing for the manufacturing equipment based on the authentication result.

* * * * *